United States Patent [19]
Koster et al.

[11] Patent Number: 5,877,502
[45] Date of Patent: Mar. 2, 1999

[54] RADIATION MONITOR FOR LIQUIDS

[75] Inventors: James E. Koster; Richard D. Bolton, both of Los Alamos, N. Mex.

[73] Assignee: The Regents of the University of California, Los Alamos, N. Mex.

[21] Appl. No.: 843,768

[22] Filed: Apr. 21, 1997

[51] Int. Cl.$^6$ ............................. G01T 1/185; H10J 47/02
[52] U.S. Cl. ............................................. 250/382; 250/374
[58] Field of Search ................................... 250/383, 382, 250/374, 380

[56] References Cited

U.S. PATENT DOCUMENTS

| | | |
|---|---|---|
| 5,184,019 | 2/1993 | MacArthur et al. . |
| 5,187,370 | 2/1993 | MacArthur et al. . |
| 5,194,737 | 3/1993 | MacArthur et al. ..................... 250/382 |
| 5,281,824 | 1/1994 | MacArthur et al. . |
| 5,311,025 | 5/1994 | MacArthur et el. ..................... 250/374 |
| 5,663,567 | 9/1997 | Steadman et al. . |
| 5,679,958 | 10/1997 | MacArthur et al. . |

*Primary Examiner*—Constantine Hannaher
*Attorney, Agent, or Firm*—Milton D. Wyrick

[57] ABSTRACT

A radiation monitor for use with liquids that utilizes air ions created by alpha radiation emitted by the liquids as its detectable element. A signal plane, held at an electrical potential with respect to ground, collects these air ions. A guard plane or guard rings is used to limit leakage currents. In one embodiment, the monitor is used for monitoring liquids retained in a tank. Other embodiments monitor liquids flowing through a tank, and bodies of liquids, such as ponds, lakes, rivers and oceans.

13 Claims, 4 Drawing Sheets

RADIATION MONITOR FOR LIQUIDS

This invention was made with Government support under Contract No. W-7405-ENG-36 awarded by the U.S. Department of Energy. The Government has certain rights in the invention.

FIELD OF THE INVENTION

The present invention is generally related to radiation monitors, and, more specifically, to radiation monitors for liquids.

The ever increasing awareness of the dangers associated with pollution in general, and particularly with radioactive pollution has brought about a demand for instruments which can monitor for pollution in any of its possible forms. One of the more difficult to monitor of the forms of radioactive pollution is that found in liquids. The nature of liquids, whether they are flowing through piping, or in oceans and lakes, makes them extremely difficult to monitor for radioactive pollutants using conventional monitor technology. Conventional detectors such as multichannel plates, gas detectors, and scintillating plate detectors are of negligible value in the monitoring of liquids.

To determine the need for this type of monitoring one has no further to look than today's headlines. There is almost daily talk of the problems generated by nuclear waste materials, whether it be from nuclear power companies, government nuclear complexes, or the companies that provide laundry for nuclear operations. Since so much of this waste is in liquid form, a well defined need exists to be able to provide a real-time monitor for such waste.

A real-time monitor for liquid contamination permits intervention of an operator or an automatic system in time to prevent major problems. Conventional monitors normally do not operate in real time, making the prevention of potentially catastrophic contamination difficult.

The present invention is based on technology which is contained in several U.S. Patents and copending patent applications which disclose various devices for the long range detection of alpha particles. The first is U.S. Pat. No. 5,184,019, issued Feb. 2, 1993, for a Long Range Alpha Particle Detector. The second is U.S. Pat. No. 5,194,737, issued Mar. 16, 1993, for Single and Double Grid Long Range Alpha Detectors. The third is U.S. Pat. No. 5,187,370, issued Feb. 16, 1993, for Alternating Current Long Range Alpha Particle Detectors. The fourth is U.S. Pat. No. 5,281,824, issued Jan. 25, 1994, for Radon Detection. The fifth is U.S. Pat. No. 5,311,025, issued May 10, 1994, for Fan-less Long Range Alpha Detector. The sixth is U.S. patent application Ser. No. 08/607,672, filed Feb. 27, 1996, for "Beta Particle Monitor For Surfaces." The sixth is U.S. patent application Ser. No. 08/657,744, filed May 31, 1996, for Apparatus For Detecting Alpha Radiation In Difficult to Access Areas, which is in receipt of a Notice of Allowance dated Feb. 27, 1997. The principle underlying each of these patents and applications is that alpha particles, although themselves of very short range in air, ionize various of the molecular species in air. These ions, referred to herein as "air ions," have a sufficiently long lifetime that they may be transported by mass flow of the surrounding air, and detected at distances much greater than the penetration distances of the original alpha particles by the apparatus disclosed in the above-referenced patents.

The present invention builds upon these prior patents and copending applications to provide apparatus capable of real-time monitoring of liquids for radioactive contamination. It can be automated to initiate actions which will prevent or minimize radioactive liquid contamination.

It is therefore an object of the present invention to provide apparatus that is capable of detecting radioactive contamination in liquids.

It is another object of the present invention to provide apparatus that is capable of real-time notification of radioactive contamination in a liquid.

It is yet another object of the present invention to provide apparatus that can initiate measures to mitigate the effect of radioactive contamination in liquids.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, apparatus for the detection of radioactive contamination emitted from liquids held in an electrically conductive tank or other electrically conductive vessel comprises a lid sealing the tank or other vessel with electrically conductive guard means insulatively attached to the lid. Electrically conductive signal plane means is insulatively attached to the electrically conductive guard means and spaced inwardly from the lid, the electrically conductive signal plane means substantially spanning the electrically conductive tank or other electrically conductive vessel, and defining a volume between the liquid and the electrically conductive signal plane means so that air ions generated in the volume through collision with alpha particles emanating from the liquid are electrostatically captured by the electrically conductive signal plane means and the electrically conductive tank or other vessel when an electric potential is applied between the electrically conductive tank or other vessel and the electrically conductive signal plane means. Indicator means is attached to the electrically conductive signal plane means for indicating an electrical current produced by collection of air ions generated in the volume by alpha particles emitted from the liquid. A voltage source is connected between the electrically conductive tank or other electrically conductive vessel, and the electrically conductive guard means and the indicator means.

In another aspect of the present invention there is provided apparatus for the detection of radioactive contamination emitted from liquids flowing through an electrically conductive tank comprising a lid for covering an opening in the tank through which the apparatus is inserted with electrically conductive guard means insulatively attached to and spaced apart from the lid. Electrically conductive signal plane means is insulatively attached to and spaced apart from the electrically conductive guard means, the electrically conductive signal plane means substantially spanning the electrically conductive tank, and defining a volume between the flowing liquid and the electrically conductive signal plane means so that air ions generated in the volume through collision with alpha particles emanating from the flowing liquid are electrostatically captured by the electrically conductive signal plane means and the electrically conductive tank when an electric potential is applied between the electrically conductive tank and the electrically conductive signal plane means. Indicator means is attached to the electrically conductive signal plane means through a shielded conductor for indicating an electrical current produced by collection of air ions generated in the volume by alpha particles emitted from the liquid. A voltage source is connected between the electrically conductive tank and the indicator means.

In yet another aspect of the present invention there is provided apparatus for monitoring radioactivity of segments of a body of liquid comprising an electrically conductive enclosure defining a cavity, the electrically conductive enclosure having an opening at one end for positioning adjacent to a segment of a body of water. Buoyancy adjustment means are attached to the electrically conductive enclosure for allowing the electrically conductive enclosure to reside at or below the surface of the body of water. Electrically conductive guard means is insulatively mounted in the cavity of the electrically conductive enclosure and spaced inwardly of the opening for reducing leakage currents. Electrically conductive signal plane means is insulatively mounted to and spaced apart from the electrically conductive guard means to define a chamber between the electrically conductive signal plane means and the surface of the segment of the body of water, the electrically conductive signal plane means being sized and positioned to substantially span the cavity so that air ions generated in the chamber are electrostatically captured by the electrically conductive signal plane means and the electrically conductive enclosure when an electric potential is applied between the electrically conductive enclosure and the electrically conductive signal plane means. Indicator means is attached to the electrically conductive signal plane means for indicating a current produced by collection of air ions generated in the chamber by alpha particles emitted from the segment of the body of water. A voltage source is connected between the electrically conductive enclosure and the electrically conductive guard means and the indicator means.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The present invention provides apparatus for monitoring either stationary or flowing liquids for radioactivity. The invention can most easily be understood through reference to the drawings.

Figure 1:
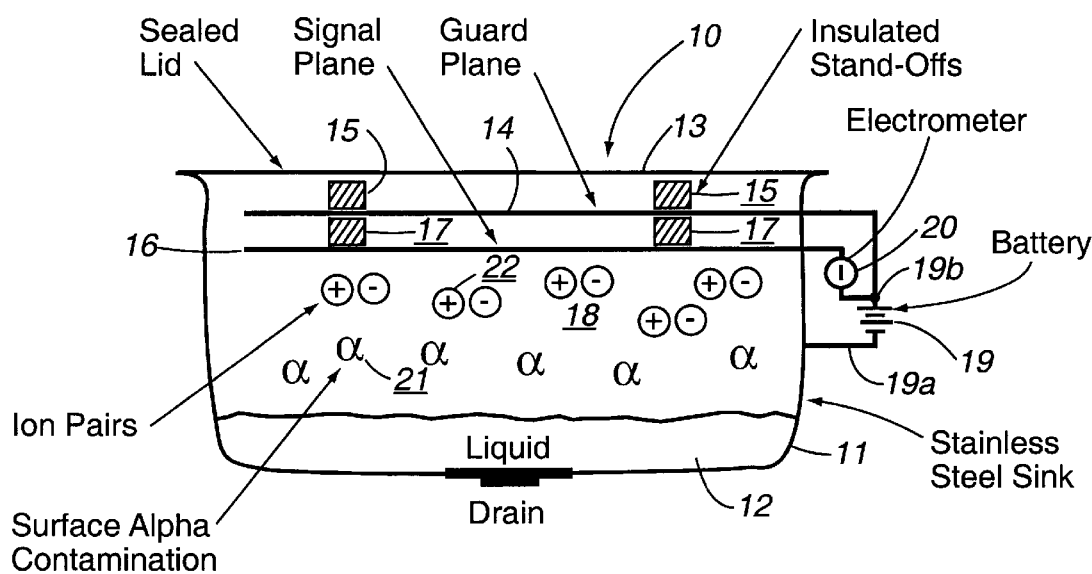
FIG. 1 is a schematical drawing of one embodiment of the present invention for monitoring liquid resident in an electrically conductive tank or other vessel.

In FIG. 1 there can be seen liquid monitor 10 mounted onto electrically conductive tank 11 which contains liquid 12. Sealing electrically conductive tank 11, is lid 13, which supports the primary components of the invention. As seen, electrically conductive guard 14 is insulatively attached to lid 13 by insulated stand-offs 15, and serves to reduce leakage currents which might interfere with accurate measurements. Electrically conductive signal plane 16 is insulatively attached to electrically conductive guard 14 by insulated stand-offs 17. Electrically conductive signal plane 16 defining volume 18 between electrically conductive signal plane 16 and liquid 12 in which radiation emitted from liquid 12 will collide with air molecules in volume 18 creating air ions which will be captured by electrically conductive signal plane 16 and electrically conductive tank 11.

Figure 2:
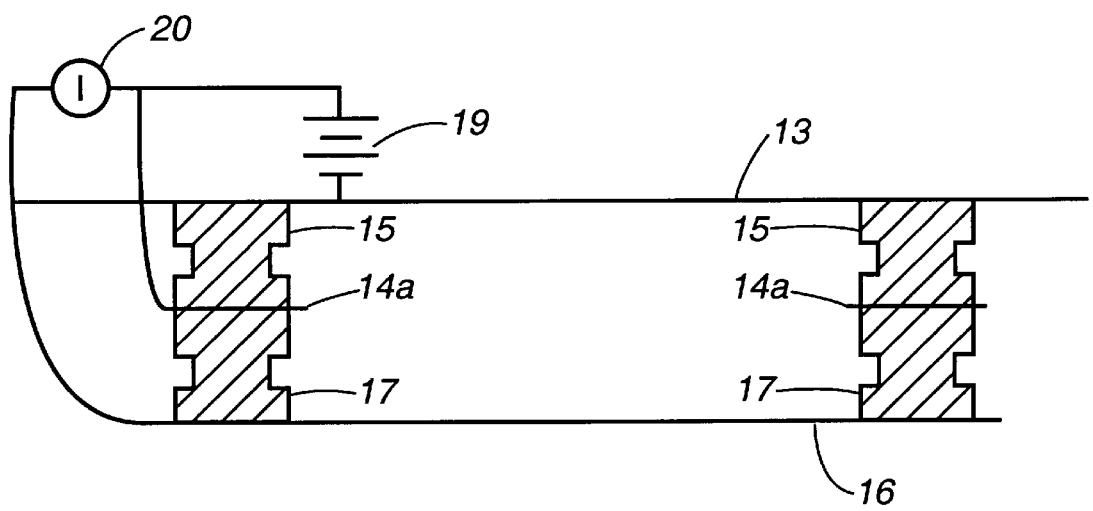
FIG. 2 is a schematical drawing of the use of guard rings in place of the guard planes shown FIG. 1 and FIG. 4.

Insulated stand-offs 15, 17 can be made of any convenient structurally strong insulating material. One satisfactory material is LEXAN® (thermoplastic carbonate-linked polymers). Electrically conductive signal plane 16 and electrically conductive guard 14 may be made of any appropriate electrically conductive material, such as copper and aluminum, and may be solid, perforated, meshed or grided. Electrically conductive guard 14 may, if desired, be planar as shown in FIG. 1, or may be in the form of rings as illustrated FIG. 2. As illustrated in FIG. 2, guard rings 14a are electrically conductive rings placed between adjacent insulated stand-offs 15, 17.

Voltage source 19 has terminal 19a connected to electrically conductive tank 11, and terminal 19b connected through electrometer 20 to electrically conductive signal plane 16, and electrically conductive guard 14. Voltage source 19 may be any appropriate voltage source capable of supplying approximately 300 volts, and is applicable to all embodiments of the present invention. Voltage source 19 conveniently may be a battery providing this voltage, or could be a power supply using a small 5–9 volt battery and stepping up the voltage to approximately 300 volts through use of a commercially available DC—DC converter. Either a battery or a step-up circuit, such as a DC—DC converter, makes the invention applicable for remote monitoring applications.

In operation, alpha particles 21, emanating from liquid 12, collide with air molecules in electrically conductive tank 11, creating air ions 22. With a voltage applied between electrically conductive signal plane 16 and electrically conductive tank 11, air ions 22 are attracted to electrically conductive signal plane 16 and electrically conductive tank 11, depending on the polarity of individual air ions 22. This collection of air ions 22 will produce a current through electrometer 20, indicating the presence of radiation in liquid 12.

Figure 3:
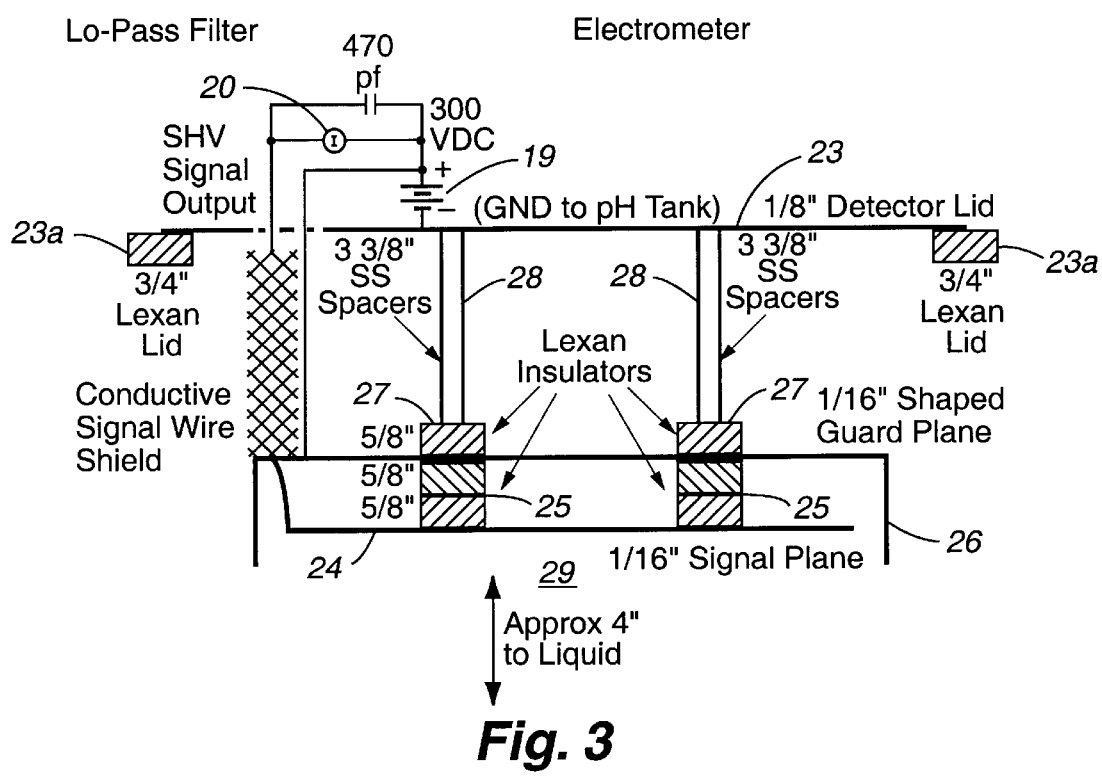
FIG. 3 is a schematical drawing of another embodiment of the present invention for monitoring liquid flowing through an electrically conductive tank.

Another embodiment of liquid monitor 10 is illustrated in FIG. 3 and is intended for the monitoring of flowing liquids. This embodiment is intended for application to in-line tanks (not shown) where liquids flow into the tank near its top, and exit near its bottom. As shown schematically in FIG. 2, detector lid 23 and insulating spacers 23a seal the opening in the tank (not shown) though which the apparatus of this embodiment is inserted.

Electrically conductive signal plane 24 is connected to electrically conductive guard 26 by insulated stand-offs 25 and electrically conductive guard plane 26 is connected mechanically to detector lid 23 through insulative stand-offs 27 and spacers 28. Electrically conductive guard plane 26 is shaped so as to define a skirt around electrically conductive signal plane 24, on order to lessen the effects on electrically conductive signal plane 24 from any natural radiation, or radiation deposited onto the walls of the tank by the flowing liquid, emanating from the walls of the tank.

In this application, electrically conductive signal plane 24 is located approximately four (4) inches above the average level of a flowing liquid. This distance allows for some normal fluctuations in the liquid level, while leaving sufficient room to define an adequate chamber 29 between electrically conductive signal plane 24 and the liquid.

Figure 4:
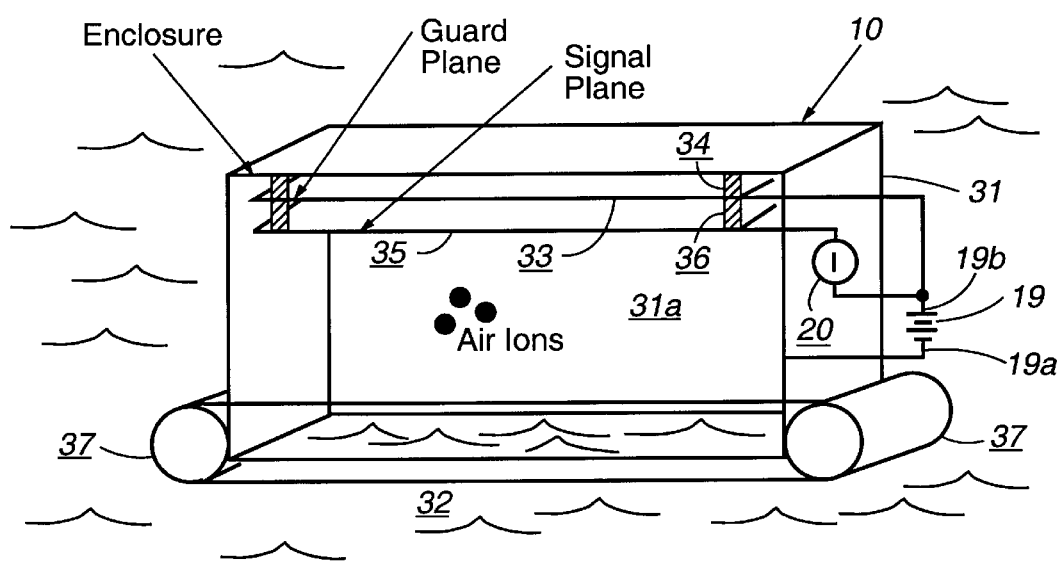
FIG. 4 is a schematical drawing of yet another embodiment of the present invention for monitoring segments of bodies of liquid.

An embodiment of the present invention for monitoring sections of large bodies of liquids is illustrated in FIG. 4. Here, electrically conductive enclosure 31 defines cavity 31a, and an opening at one end for positioning adjacent to a surface of liquid 32. As in the other embodiments of the present invention, electrically conductive guard 33 is attached to electrically conductive enclosure 31 by insulative stand-offs 34, and electrically conductive signal plane 35 is connected to electrically conductive guard 33 by insulative stand-offs 36.

Voltage source 19 has terminal 19a connected to electrically conductive enclosure 31. Terminal 19b is connected through electrometer 20 to electrically conductive signal plane 35, and to electrically conductive guard 33.

As in the first embodiment for monitoring standing liquids, electrically conductive guard 33 may either be planar as illustrated, or be guard rings as illustrated by guard rings 14a in FIG. 2.

Buoyancy adjusters 37 are attached to electrically conductive enclosure 31 to provide the desired buoyancy for liquid monitor 10. In some applications, maintaining liquid monitor 10 at the surface of liquid 32 is required. In other applications, information might be required of particular subsurface regions. In this event, buoyancy adjusters 37 would be adjusted to allow liquid monitor 10 to sink below the surface to the desired depth. Below the surface, the airtightness of electrically conductive enclosure 31 will maintain cavity 31a in which alpha radiation emanating from a surface of liquid 32 will collide with air molecules in cavity 31a, creating air ions 38.

Buoyancy adjusters 37 are commercially available, and are of the type commonly used in scuba diving applications. Each consists of a bladderless float and a small charge of pressurized air. The float normally is made of denier nylon with an internal fabric of bonded polyurethane. A buoyancy control module allows the setting of proper inflation of the float by the high pressure charge of air. This control module is a pressure regulator which permits flow form the high pressure charge of air to the lower pressure float. Deflation of the float for lowering the depth of liquid monitor 10 is accomplished by a release valve which vents some of the air into the surrounding water.

Alternatively, this embodiment of liquid monitor 10 could be tethered to the floor of liquid 32. Liquid monitor 10 thereby could be maintained on the surface of liquid 32, or pulled down to a desired depth below the surface by the tether (not shown).

Being relatively inexpensive, strings of this embodiment of liquid monitor 10 could be deployed in large liquid environments. The strings could monitor at different depths or in various directions at or below the surface to provide profiles of the radiation within liquid 32.

The foregoing description of the embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Apparatus for monitoring radioactivity of segments of a body of liquid comprising:

an electrically conductive enclosure defining a cavity, said electrically conductive enclosure having an opening at one end for positioning adjacent to a segment of a body of liquid;

buoyancy adjustment means attached to said electrically conductive enclosure for allowing said electrically conductive enclosure to reside at or below the surface of said body of liquid;

electrically conductive guard means insulatively mounted in said cavity of said electrically conductive enclosure and spaced inwardly of said opening for reducing leakage currents;

electrically conductive signal plane means insulatively mounted to and spaced apart from said electrically conductive guard means to define a chamber between said electrically conductive signal plane means and said surface of said segment of said body of liquid, said electrically conductive guard means and said electrically conductive signal plane means being sized and positioned to substantially span said cavity so that air ions generated in said chamber are electrostatically captured by said electrically conductive signal plane means and said electrically conductive enclosure when an electric potential is applied between said electrically conductive enclosure and electrically conductive signal plane means;

indicator means attached to said electrically conductive signal plane means for indicating a current produced by collection of air ions generated in said chamber by alpha particles emitted from said segment of said body of liquid; and a voltage source connected between said electrically conductive enclosure and said electrically conductive guard means and said indicator means.

2. The apparatus as described in claim 1 wherein said electrically conductive guard means and said electrically conductive signal plane means are made of aluminum.

3. The apparatus as described in claim 1 wherein said electrically conductive guard means and said electrically conductive signal plane means are made of copper.

4. The apparatus as described in claim 1, wherein said electrically conductive guard means and said electrically conductive signal plane means comprise perforated sheets of electrically conductive material.

5. The apparatus as described in claim 1, wherein said electrically conductive guard means and said electrically conductive signal plane means comprise planar electrically conductive grids.

6. The apparatus as described in claim 1, wherein said electrically conductive guard means comprises electrically conductive guard rings.

7. The apparatus as described in claim 1, wherein said electrically conductive guard means and said electrically conductive signal plane means are insulatively mounted inside said electrically conductive enclosure using thermoplastic carbonate-linked polymer stand-offs.

8. The apparatus as described in claim 1, wherein said voltage source comprises a battery having a voltage of approximately 300 VDC.

9. The apparatus as described in claim 1, wherein said voltage source comprises a low voltage battery stepped up to approximately 300 VDC by a DC—DC converter.

10. The apparatus as described in claim 1, wherein said voltage source comprises a source of approximately 300 VAC.

11. The apparatus as described in claim 1, wherein said indicator means comprises an electrometer.

12. The apparatus as described in claim 1, wherein said buoyancy adjustment means comprises tether means for maintaining said apparatus at a predetermined position at or below the surface of said body of liquid.

13. The apparatus as described in claim 1, wherein said buoyancy adjustment means comprises a float and a high pressure charge of air.

* * * * *